US007773809B2

(12) United States Patent
Lee et al.

(10) Patent No.: US 7,773,809 B2
(45) Date of Patent: Aug. 10, 2010

(54) METHOD AND APPARATUS FOR DISTINGUISHING OBSCENE VIDEO USING VISUAL FEATURE

(75) Inventors: Seung Min Lee, Daejeon (KR); Taek Yong Nam, Daejeon (KR); Jong Soo Jang, Daejeon (KR); Ho Gyun Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1111 days.

(21) Appl. No.: 11/442,565

(22) Filed: May 26, 2006

(65) Prior Publication Data

US 2007/0098267 A1    May 3, 2007

(30) Foreign Application Priority Data

Oct. 27, 2005  (KR)  ...................... 10-2005-0101737

(51) Int. Cl.
  G06K 9/00  (2006.01)
  G06K 9/46  (2006.01)
  G06K 9/62  (2006.01)
  G10L 15/06  (2006.01)
  G04H 60/32  (2006.01)

(52) U.S. Cl. ...................... 382/190; 382/103; 382/224; 704/245; 725/19

(58) Field of Classification Search ................ 382/100, 382/159, 224, 120, 173, 103, 199, 117, 170, 382/243, 303, 190, 143, 145, 141, 144; 348/700, 348/607, 610, E5.067, E5.066, E17, 208.1, 348/152, 156, 143; 704/201, 236, 239, E11.007, 704/E15.004, 245, 244; 715/700, 723; 345/98, 345/99, 698, 213, 3.3; 707/E17.01; 706/12, 706/48, 46; 705/3, 10, 17; 359/798; 84/615; 725/13, 19; 709/207

See application file for complete search history.

(56) References Cited

U.S. PATENT DOCUMENTS 7,151,852 B2 * 12/2006 Gong et al. .................. 382/173

(Continued)

FOREIGN PATENT DOCUMENTS

JP         6-141335        5/1994

(Continued)

OTHER PUBLICATIONS

"Multi-modal Classification in Digital News Libraries," by Ming-Yu Chen, et al.; *Proceedings of the 2004 Joint ACM/IEEE COnference on Digital Libraries* (JCDL '04); 2004; pp. 212-213.

Primary Examiner—Sheela C Chawan
(74) Attorney, Agent, or Firm—Blakely, Sokoloff, Taylor & Zafman (57) ABSTRACT

A method and apparatus for generating discriminant functions for distinguishing obscene videos by using visual features of video data, and a method and apparatus for determining whether videos are obscene by using the generated discriminant functions, are provided. The method of generating discriminant functions includes: creating a first frame set by extracting a predetermined number of frames for each video data unit from a group of video data classified as obscene or non-obscene, and creating a second frame set by selecting the frames; generating a frame based discriminant function by extracting visual features of frames of the second frame set, and then generating a first discriminant value by determining whether each frame of the first frame set contains obscene video data; generating a group frame based discriminant function by extracting visual features of a group of frames of the first frame set, and then generating a second discriminant value by determining whether the frames of the group contain obscene video data; and generating a synthetic discriminant function by using the first and second discriminant values as a representative value of the video data. Accordingly, obscene video data stored in a computer system can be automatically and accurately distinguished.

6 Claims, 11 Drawing Sheets

U.S. PATENT DOCUMENTS

| | | | |
|---|---|---|---|
| 7,418,134 B2 * | 8/2008 | Schwartz et al. | 382/173 |
| 7,519,217 B2 * | 4/2009 | Liu et al. | 382/159 |
| 7,551,234 B2 * | 6/2009 | Zhou et al. | 348/700 |

FOREIGN PATENT DOCUMENTS

| | | |
|---|---|---|
| KR | 1998-041072 | 8/1998 |
| KR | 2001-0030681 | 4/2001 |
| KR | 1020010107528 A | 12/2001 |
| KR | 2002-0015492 | 2/2002 |
| KR | 1020030067135 A | 8/2003 |
| KR | 10-2004-0046537 | 6/2004 |
| KR | 10-2006-0024687 | 3/2006 |

* cited by examiner

METHOD AND APPARATUS FOR DISTINGUISHING OBSCENE VIDEO USING VISUAL FEATURE

CROSS-REFERENCE TO RELATED PATENT APPLICATION

This application claims the benefit of Korean Patent Application No. 10-2005-0101737, filed on Oct. 27, 2005, in the Korean Intellectual Property Office, the disclosure of which is incorporated herein in its entirety by reference.

BACKGROUND OF THE INVENTION

1. Field of the Invention

The present invention relates to a method and apparatus for generating discriminant functions for distinguishing obscene videos by using visual features of video data, and a method and apparatus for determining whether videos are obscene by using the discriminant functions, and more particularly, to a method of distinguishing obscene videos, in which frames of the video data are analyzed according to a conventional image classification method to generate a frame based discriminant value (a feature value) and a group frame based discriminant value (a feature value), and an optimum discriminant function is obtained from the two discriminant values to determine whether all the video data is obscene.

2. Description of the Related Art

Obscene videos have been distinguished using a conventional image classification method. In this method, still pictures are extracted from video data, and if the still pictures are determined to be obscene, all the video data is determined to be obscene. However, since this method is no different from a method of simply classifying images, it has the drawback that videos may be wrongly determined to be obscene when the image classification is not accurately carried out.

SUMMARY OF THE INVENTION

The present invention provides a method and apparatus for generating an optimum discriminant function by creating discriminant values to optimize visual features of video data, after extracting frame based visual features and group frame based visual features.

The present invention also provides a method and apparatus for distinguishing obscene videos, in which frames of input video data are extracted, and visual features of each frame and visual features of each group frame are extracted from the frames of the video data to be compared with the generated discriminant function.

According to an aspect of the present invention, there is provided a method of generating discriminant functions for distinguishing obscene videos using visual features of video data, comprising: creating a first frame set by extracting a predetermined number of frames for each video data unit from a group of video data classified as obscene or non-obscene, and creating a second frame set by selecting the frames; generating a frame based discriminant function by extracting visual features of frames of the second frame set, and then generating a first discriminant value by determining whether each frame of the first frame set contains obscene video data; generating a group frame based discriminant function by extracting visual features of a group of frames of the first frame set, and then generating a second discriminant value by determining whether the frames of the group contain obscene video data; and generating a synthetic discriminant function by using the first and second discriminant values as a representative value of the video data.

According to another aspect of the present invention, there is provided an apparatus for generating discriminant functions for distinguishing obscene videos using visual features of video data, comprising: a frame set generator which categorizes videos and then generates a first frame set including a predetermined number of frames and a second frame set including frames selected from the first frame set; a discriminant value generator which extracts visual features of frames of the second frame set and then generates a first discriminant value by generating a frame based discriminant function and determining whether each frame of the first frame set contains obscene video data; a group frame based discriminant value generator which creates a group of frames included in the first frame set, then generates a group frame based discriminant function by extracting visual features of the group, and then determines whether each frame of the group contains obscene video data; and a third discriminant function generator to which the first and second discriminant values are input and which generates a synthetic discriminant function by using a statistical discriminant analysis method, a machine learning method, or a rule generating method.

According to another aspect of the present invention, there is provided a method of distinguishing obscene videos by using visual features of video data, comprising: generating a first discriminant value by using a frame based discriminant function, a second discriminant value by using a group frame based discriminant function, and a synthetic discriminant value by combining the first discriminant value and the second discriminant value, after frames are extracted from the video data classified as obscene or non-obscene; extracting frames from the input video data requested to be determined as obscene or non-obscene; generating a third discriminant value after determining whether each frame of the input video data contains obscene video data by substituting visual feature values of each frame of the video data into the frame based discriminant function, and generating a fourth discriminant value after determining whether each group frame of the input video data contains obscene video data by substituting visual feature values of group frames selected among from the extracted frames; and combining the third discriminant value and the fourth discriminant value, and determining whether the video data is obscene by substituting the combined value of the third discriminant value and the fourth discriminant value into the synthetic discriminant function.

According to another aspect of the present invention, there is provided an apparatus for distinguishing obscene videos using visual features of video data after receiving inputs of a frame based discriminant function, a group frame based discriminant function, and a synthetic discriminant function, which are generated on the basis of visual features of frames of the video data, the apparatus comprising: a frame extractor which extracts a predetermined number of frames from the input video data; an input frame feature unit which extracts a frame based first visual feature and a group frame based second visual feature from the extracted frames; a third discriminant value generator which determines whether the extracted frames contain obscene video data by substituting the first visual feature into the frame based discriminant function and then generates a third discriminant value; a fourth discriminant value generator which determines whether the extracted frames contain obscene video data by substituting the second visual feature into the group frame based discriminant function and then generates a fourth discriminant value; and an obscenity determination unit which combines the third and fourth discriminant values and then substitutes the combined value into the synthetic discriminant function to determine whether the input video data is obscene.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
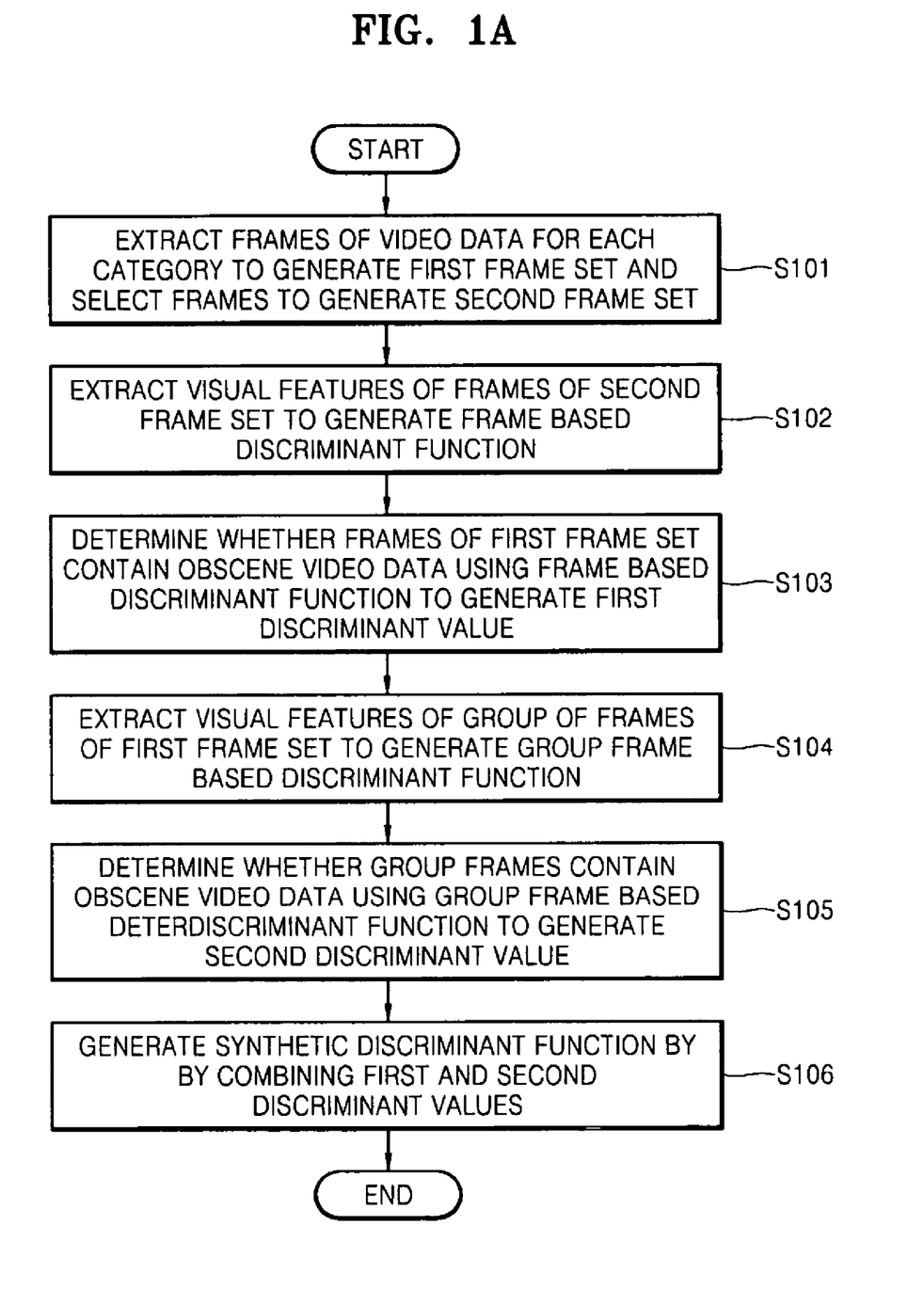
FIG. 1A is a flowchart of a method of generating discriminant functions for distinguishing obscene videos using visual features, according to an embodiment of the present invention.
Figure 1B:
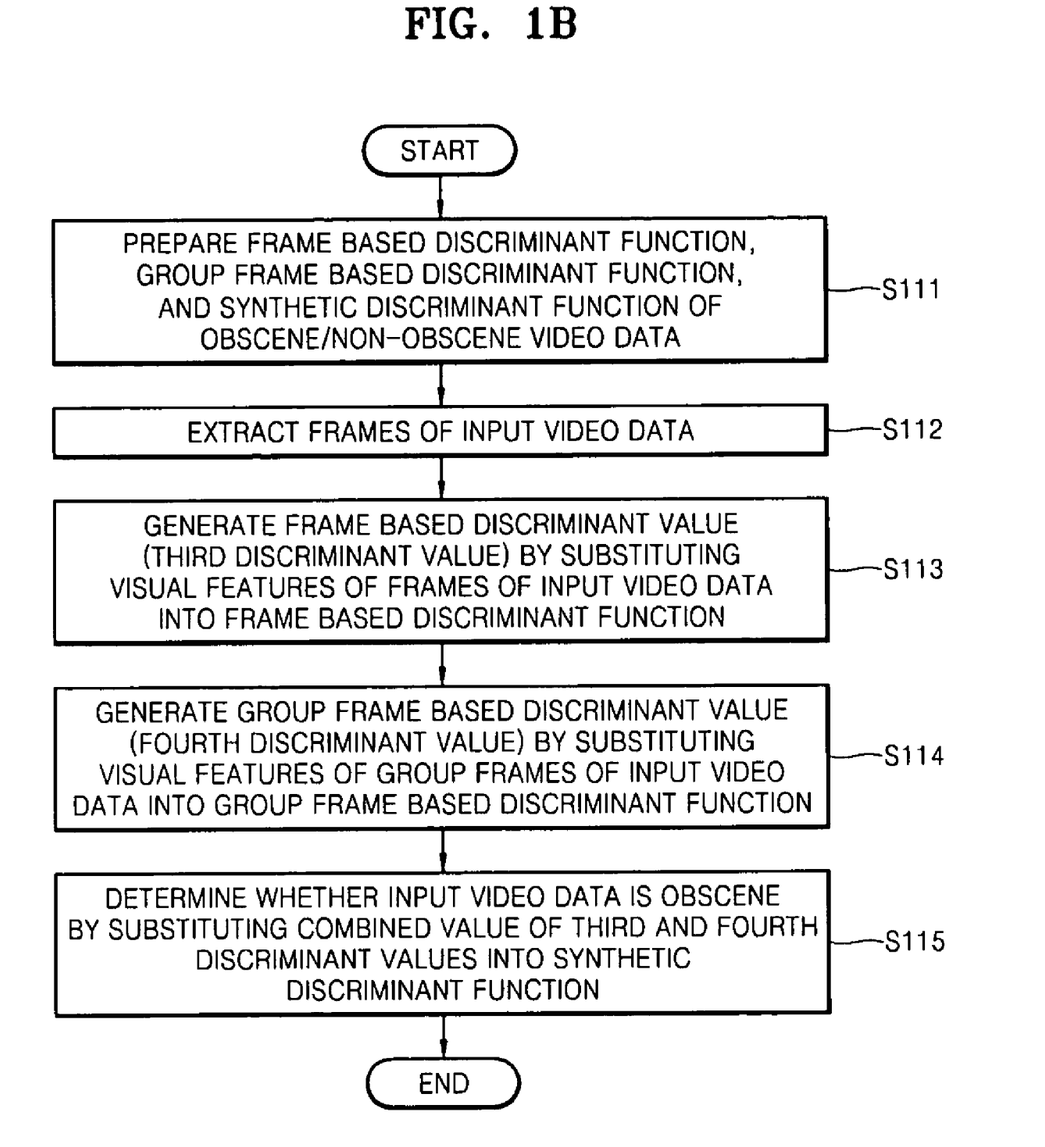
FIG. 1B is a flowchart of a method of determining whether input video data is obscene, according to an embodiment of the present invention.
Figure 1C:
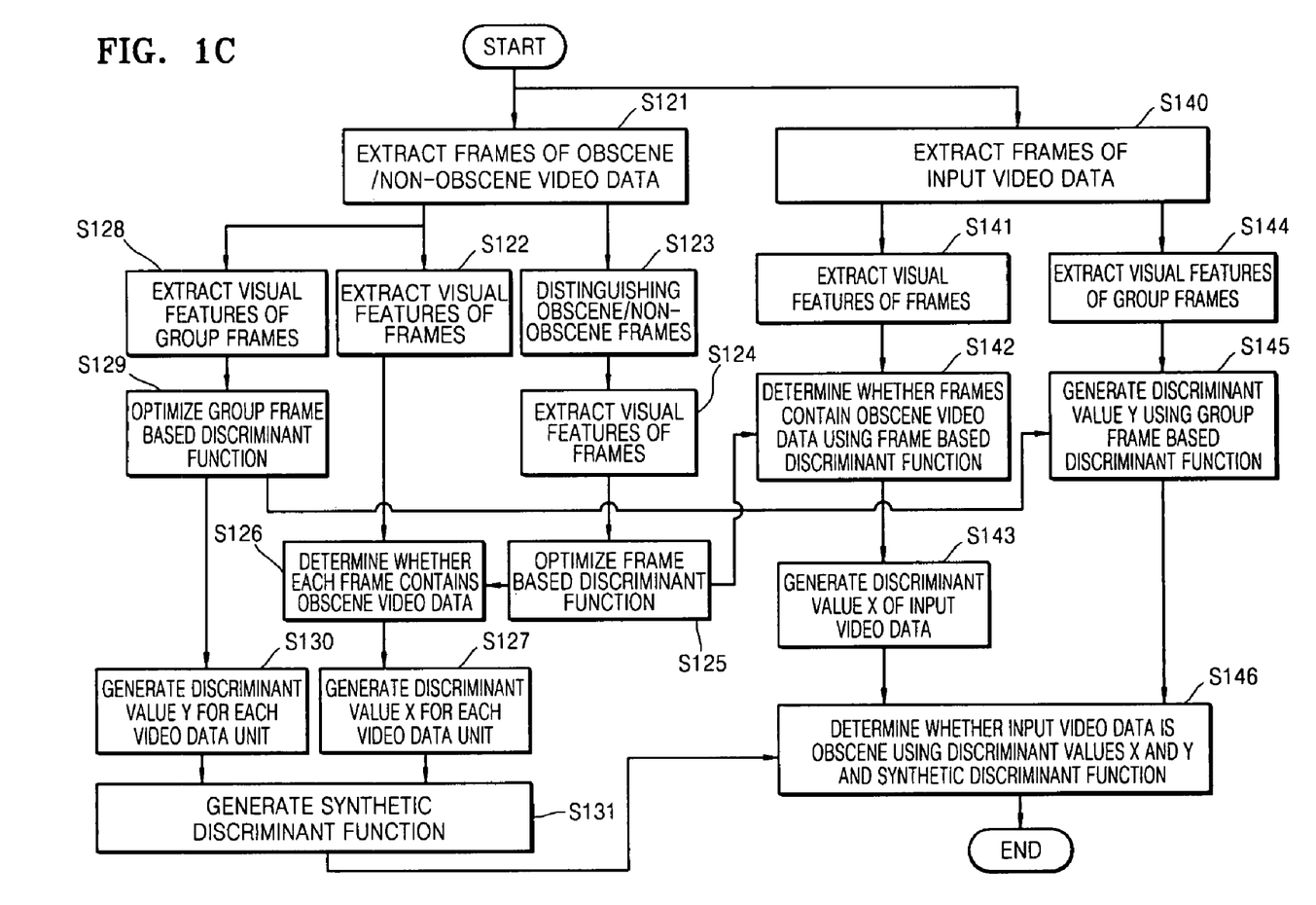
FIG. 1C is a flowchart of a method of distinguishing obscene videos using visual features and the process of generating discriminant functions, according to an embodiment of the present invention.
Figure 2:
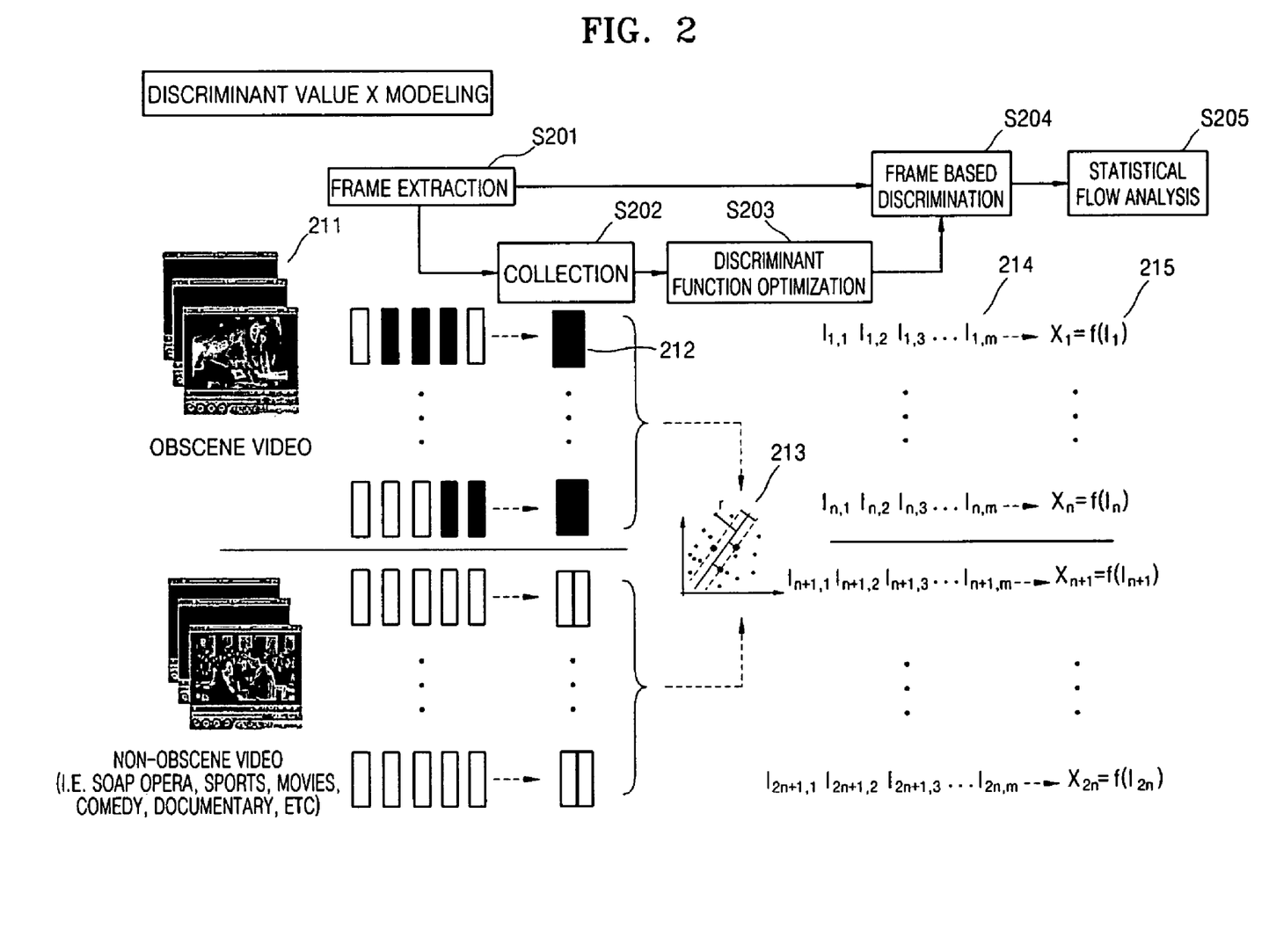
FIG. 2 shows the process of generating the frame based discriminant value X of FIG. 1.

The present invention will now be described in detail by explaining an exemplary embodiment of the invention with reference to the attached drawings. The drawings will be described briefly first. FIG. 1 shows the general process of distinguishing obscene videos using visual features such as color (i.e. skin color, HSV histogram, etc), shape, and texture. FIG. 2 shows the process of generating a discriminant function by extracting a frame based visual feature and generating discriminant values X from the result of determining whether each frame contains obscene video data by using the discriminant function. If N data sets, that is, the number of collected video data units for each category, are collected, then N discriminant values X are generated. The discriminant values X may be statistical values such as the fraction of frames determined to contain obscene video data, the average of discriminant values for each frame, or the sum of the top n frames determined to contain obscene video data.

Figure 3:
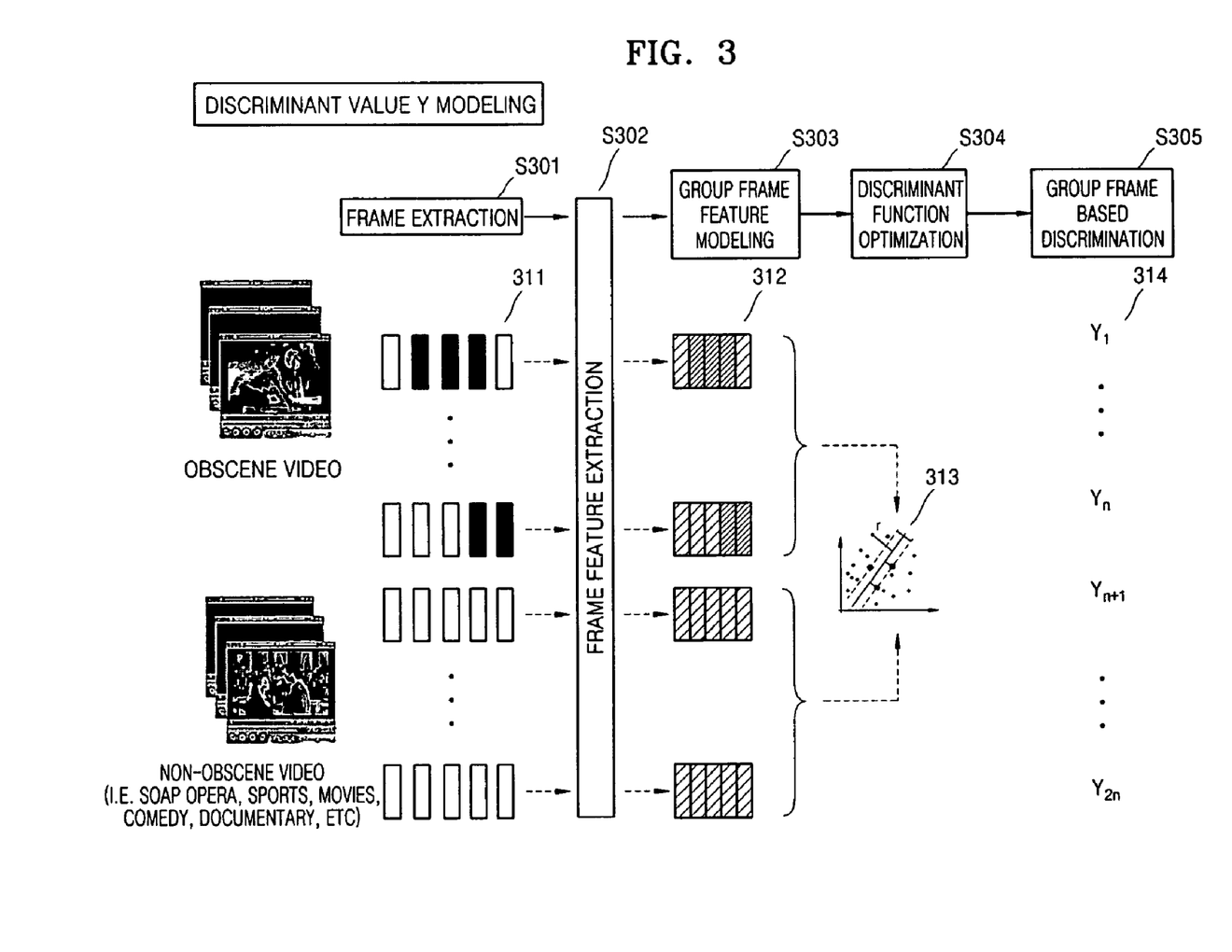
FIG. 3 shows the process of generating the group frame based discriminant value Y of FIG. 1.

FIG. 3 shows the process of generating a discriminant function by extracting a group frame based visual feature and generating a group frame discriminant value Y from the result of determining whether each frame contains obscene video data by using the discriminant function. If N data sets are collected, then N group frame discriminant values Y are generated. Here, the group frame discriminant values Y are generated through the discriminant function generated by using a group frame feature. The group frame feature may be a color histogram, that is a feature of each frame, or may be a statistical value such as an average or median of dominant colors.

Figure 4:
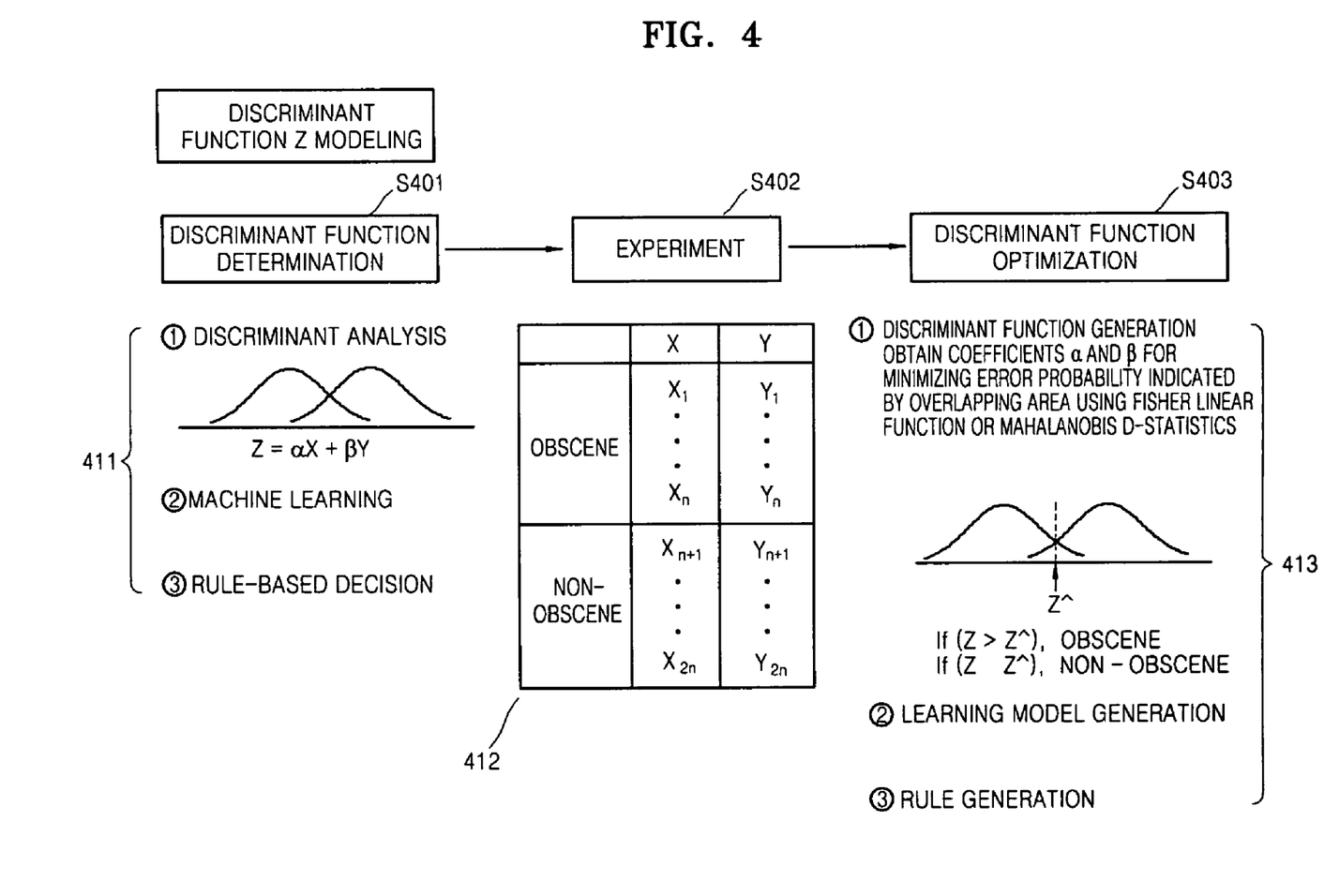
FIG. 4 shows a method of generating the synthetic discriminant function of FIG. 1.

FIG. 4 shows the process of obtaining a synthetic discriminant function through experiment after analyzing the discriminant values X and Y of FIGS. 2 and 3 and determining a method of generating the synthetic discriminant function. The discriminant function may be a discriminant analysis method, a machine learning method, or a rule-based decision method.

Figure 5:
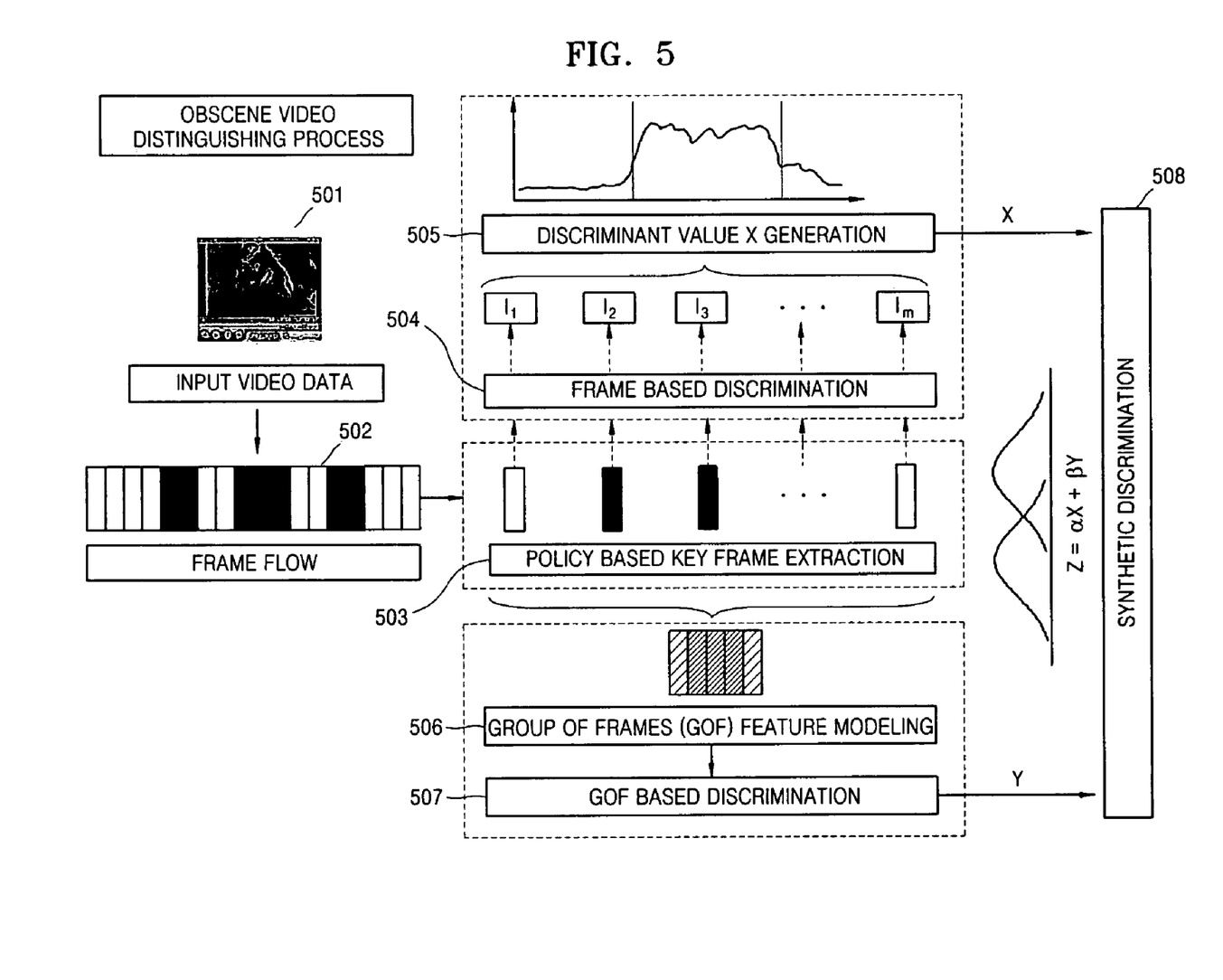
FIG. 5 shows the process of distinguishing obscene videos of FIG. 1.

FIG. 5 shows the process of determining whether input video data is obscene using the discriminant function generated through the processes described in FIGS. 2 to 4.

A method and apparatus for generating discriminant functions for distinguishing obscene videos using visual features, and a method and apparatus for distinguishing obscene videos according to an embodiment of the present invention will now be described in detail.

Figure 7A:
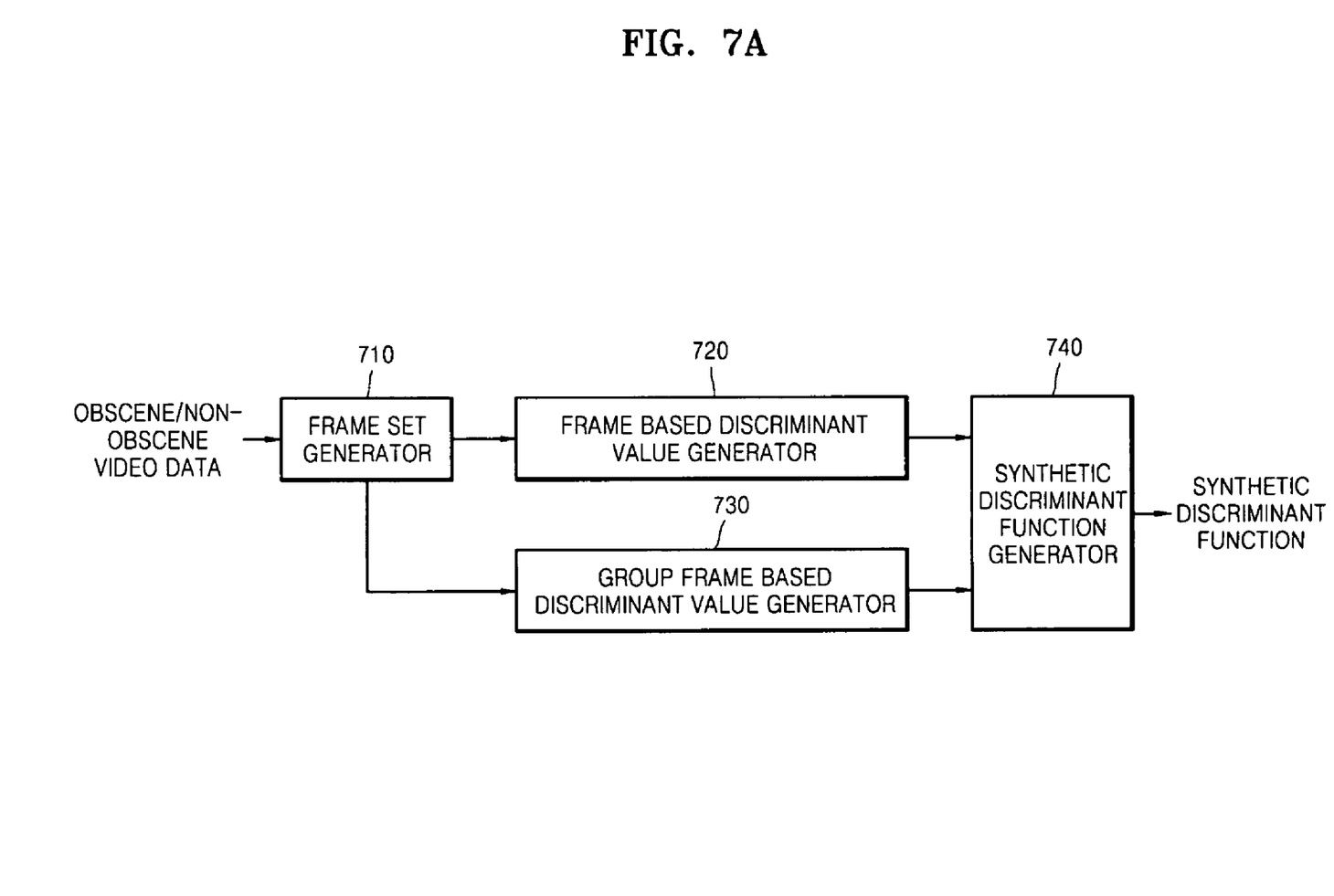
FIG. 7A is a block diagram of an apparatus for generating discriminant functions for distinguishing obscene videos using visual features, according to an embodiment of the present invention.

First, the method and apparatus for generating discriminant functions for distinguishing obscene movies using visual features will be described with reference to FIGS. 1A and 7A. A frame set generator 710 extracts frames of video data based on its category and then generates a first frame set to create data for determining whether the video data is obscene. Then, the frame set generator 710 generates a second frame set by selecting frames from the first frame set. The process here is performed in operation S101. A frame based discriminant value generator 720 extracts visual features of the second frame set to generate a frame based discriminant function in operation S102. By using the frame based discriminant function, the frame based discriminant value generator 720 determines whether frames of the first frame set contain obscene video data, and then generate a frame based discriminant value (a first discriminant value) in operation S103. A group frame based discriminant value generator 730 groups frames of the first frame set, extracts visual features of each group, and generates a group frame based discriminant function in operation 104. By using the group frame based discriminant function, the group frame based discriminant value generator 730 determines whether each group frame contains obscene video data, and then generates a group frame based discriminant value (a second discriminant value) in operation S105. A synthetic discriminant function generator 740 uses the first and second discriminant values to generate a synthetic discriminant function in operation S106.

Figure 8:
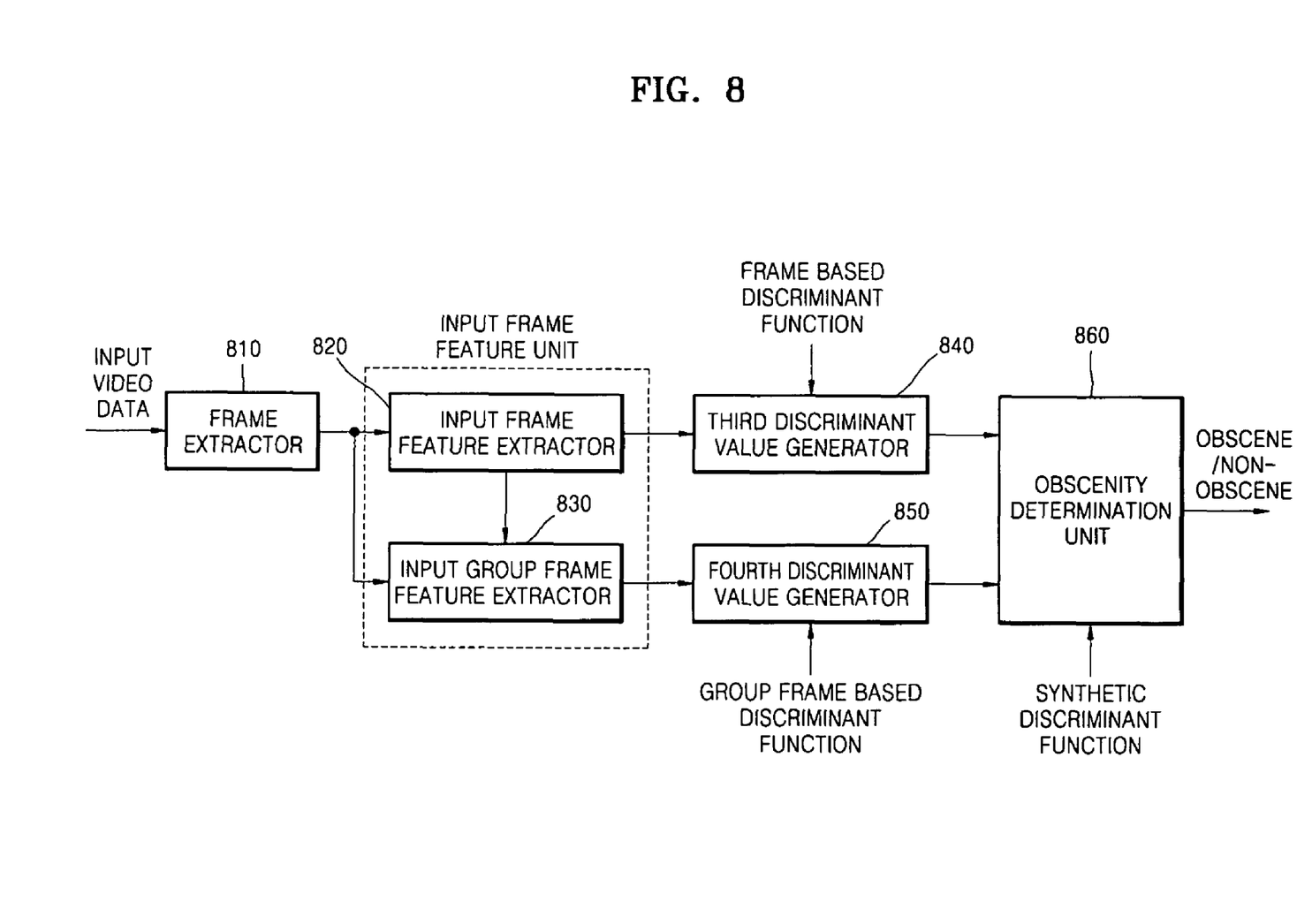
FIG. 8 is a block diagram of an apparatus for distinguishing obscene videos using visual features, according to an embodiment of the present invention.

The method and apparatus for determining whether input video data is obscene will now be described with reference to FIGS. 1B and 8. Each discriminant function is input to a discriminant function generator in operation S111. A frame extractor 810 extracts frames from the input video data which is to be checked. An input frame feature unit includes an input frame feature extractor 820 and an input group frame feature extractor 830. The input frame feature extractor 820 extracts visual features from the frames of the input video data. In addition, the input group frame feature extractor 830 extracts visual features of a group frame in which a predetermined number of the frames of the input video data are grouped in operation S112. A third discriminant value generator 840 substitutes the visual features output from the input frame feature extractor 820 into the frame based discriminant function to output a frame based discriminant value (a third discriminant value) in operation S113. An obscenity determination unit 860 substitutes the third and fourth discriminant values into the synthetic discriminant function to determine whether the input video data is obscene in operation S114 and S115.

Figure 7B:
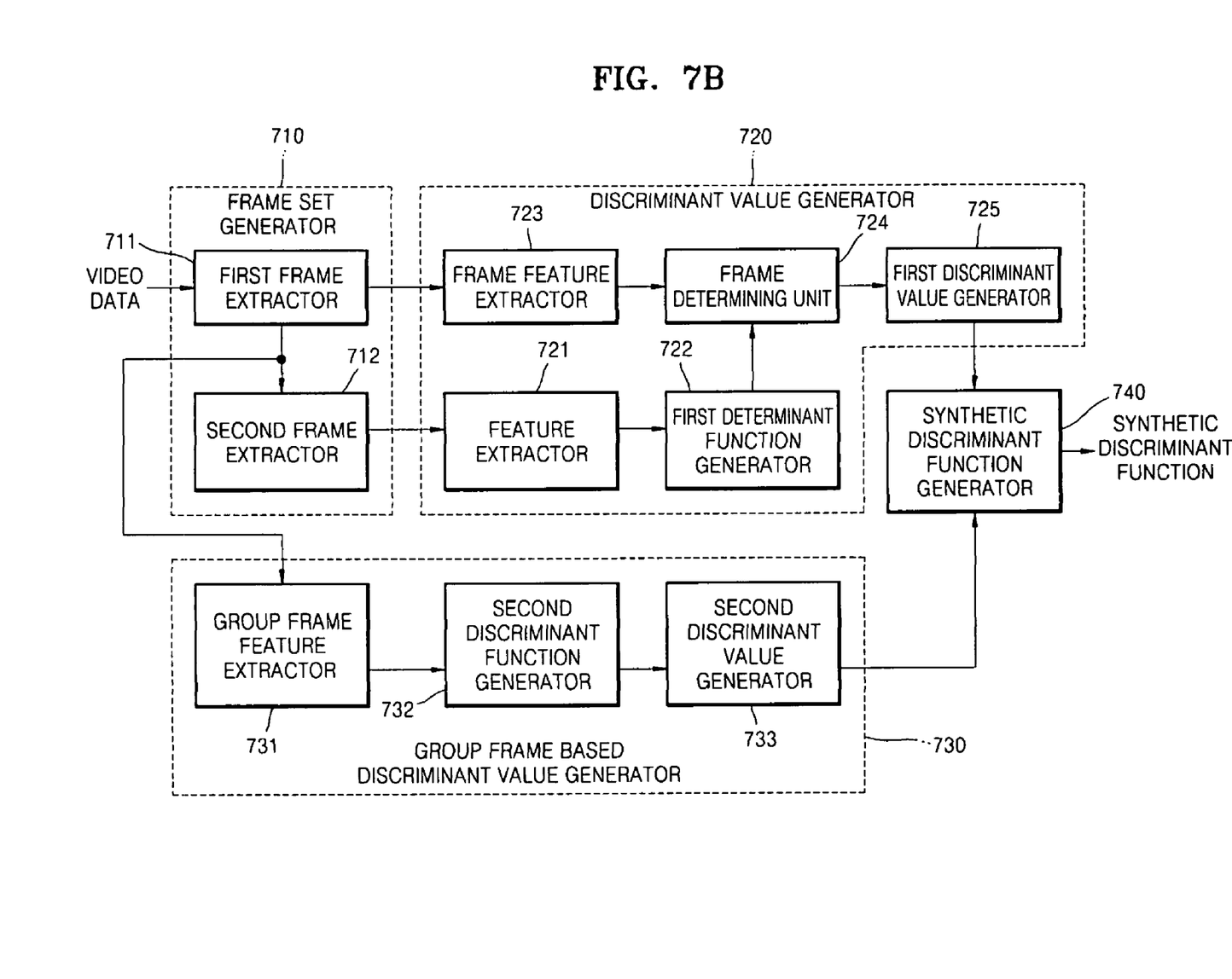
FIG. 7B is a block diagram of the apparatus for generating discriminant functions of FIG. 7A.

An embodiment of the present invention will now be described in detail with reference to FIGS. 1C and 7B. In order to generate discriminant functions, a first frame extractor 711 collects specific units of video data (a data set) as shown in the following tables 1A and 1B. and then extracts a predetermined number of frames F (for example, 50 frames) at equal intervals in operation S122.

TABLE 1A

| Obscene video data units | Still picture (key frame) |
| --- | --- |
| 1,000 | $F_{1,1} \ldots F_{1,50}$<br>$F_{1000,1} \ldots F_{1000,50}$ |

TABLE 1B

| Non-obscene video data | Still picture (key frame) |
| --- | --- |
| Movie | $F_{1,1} \ldots F_{1,50}$<br>$F_{200,1} \ldots F_{200,50}$ |
| Soap opera | $F_{201,1} \ldots F_{201,50}$<br>$F_{400,1} \ldots F_{400,50}$ |
| Documentary | $F_{401,1} \ldots F_{401,50}$<br>$F_{600,1} \ldots F_{600,50}$ |
| Sports | $F_{601,1} \ldots F_{601,50}$<br>$F_{800,1} \ldots F_{800,50}$ |
| Music | $F_{801,1} \ldots F_{801,50}$<br>$F_{1000,1} \ldots F_{1000,50}$ |

As shown in the following tables 2A and 2B, in order to generate the discriminant value X, a second frame extractor 712 selects 10,000 frames each for obscene video data and non-obscene video data (10 frames for each unit of obscene video data and 10 frames for each unit of non-obscene video data) from the extracted still pictures of the tables 1A and 1B in operation S121. The reason to select the frames is that non-obscene still pictures are also included in the obscene video data. Obscene still pictures are manually selected from the obscene video data. The same is applied to the non-obscene video data.

TABLE 2A

| Obscene video data units | Still picture (key frame) |
| --- | --- |
| 1,000 | 10,000 units of obscene video data (only obscene video data is selected) |

TABLE 2B

| Non-obscene video data | Still picture (key frame) |
| --- | --- |
| Movie | 2,000 units of selected non-obscene video data |
| Soap opera | 2,000 units of selected non-obscene video data |
| Documentary | 2,000 units of selected non-obscene video data |
| Sports | 2,000 units of selected non-obscene video data |
| Music | 2,000 units of selected non-obscene video data |

A feature extractor 721 obtains a probability value of a skin color for each pixel from the selected frames in operation S123 of tables 2A to 2B. Since the number of pixels varies according to the size of a frame, the number of pixels is normalized to be 100 pixels, that is, 10×10 (width×height). If the size of the frame is 500×500, the number of pixels is normalized such that one pixel has the average of the probability value of the skin color for 2,500 pixels (50×50). If the 100 probability values of the skin color obtained as described above is defined as a feature value, and the feature value is estimated from the selected frames containing obscene/non-obscene video data in operation S124, then a first determinant function generator 722 obtains an optimum discriminant function fx of FIG. 2 using a support vector machine (SVM) of a machine learning method in operation S126. A frame determining unit 724 uses the discriminant function fx to determine whether the extracted frames of FIGS. 1A to 1B contain obscene video data in operation S126. As a result, a first discriminant value generator 725 determines a distance r using the discriminant function fx. Referring to FIG. 2, 50 discriminant result values I are shown for each video data unit. If the discriminant value X is defined as $$X = \sum \frac{I}{50},$$

then 1,000 discriminant values X are obtained for each obscene/non-obscene video data unit. Here, the discriminant values X are averages of the distances r of the extracted frames for each video data in operation S127.

Figure 6:
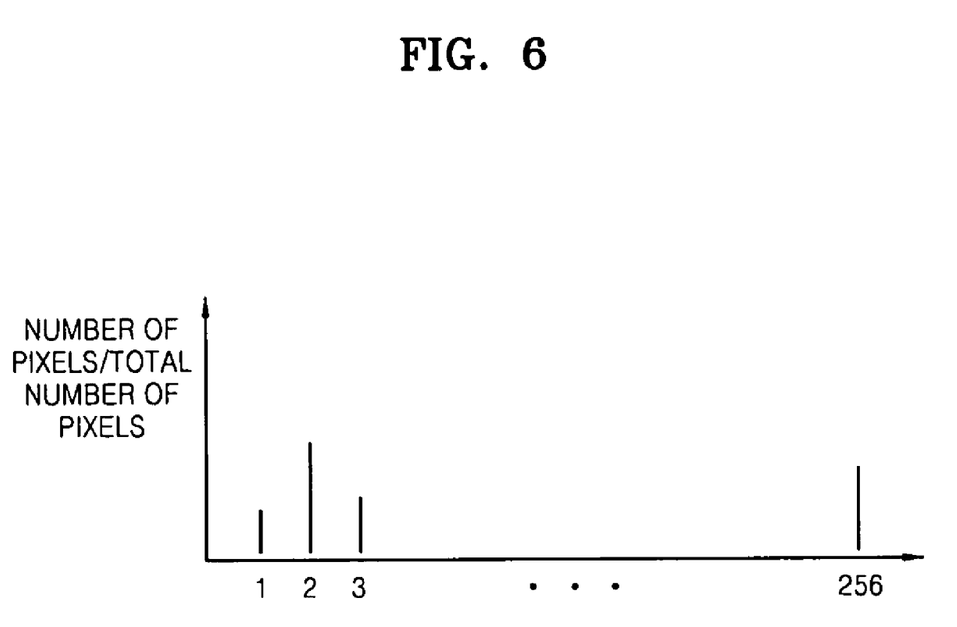
FIG. 6 shows a distribution of feature values of one frame used to obtain group frame feature values.

The process of generating the discriminant value Y will now be described. A group frame feature extractor 731 represents each extracted still picture (the first frame set) of FIGS. 1A and 1B in a hue-saturation-value (HSV) color space. In the HSV color space, hue H is divided by 16 in the range of 0 to 360°, saturation S is divided into 4 in the range of 0 to 1, and value V is divided into 4 in the range of 0 to 1, so that an HSV value can be 256 (16×4×4). Since the number of pixels varies according to the size of each still picture, the number of pixels is normalized (the number of pixels of each still picture/the total number of pixels) to have a distribution as shown in FIG. 6, when the obtained HSV value is 256. Namely, 256 color values are extracted from each still picture as feature values. Further, HSV values of 50 frames for each video data unit are averaged to be used as a feature value for group frames. The number of group frames for each obscene/non-obscene video data is 1,000, and the number of feature values for each group frame is 256 in operation S128. According to the feature values, a second discriminant value generator 732 obtains an optimum discriminant function fy using the SVM of the machine learning method in operation S129. A second discriminant value generator 733 uses the discriminant function fy to determine whether each group frame contains obscene video data. As a result, a distance r is obtained using the discriminant function fy. 1,000 discriminant values Y are obtained for each obscene/non-obscene video data in operation S130.

Using the 1,000 discriminant values X and 1,000 discriminant values Y for each obscene/non-obscene video data as a representative feature of the video data, a synthetic discriminant function generator 740 obtains coefficients α and β for minimizing discriminant errors in the equation Z=αX+βY which will be described later with reference to FIG. 4, thereby generating a discriminant function in operation S131.

The process of determining whether video data is obscene or non-obscene using the generated discriminant functions when substantial video data is input will now be described. A frame extractor 810 extracts 50 frames at equal intervals for each input video data unit in operation S140. Then, in order to obtain the discriminant values X for the extracted frames, an input frame feature extractor 820 extracts feature values for each frame in operation S141. When the discriminant function fx is input to the third discriminant generator 840, the third discriminant generator 840 substitutes the frame feature values into the discriminant function fx. As a result, the discriminant values X are obtained for each frame. Then, the average of the discriminant values X is estimated in operations S142 and S143. An input group frame feature extractor 830 extracts group frame feature values for each of 50 frames in the same manner in operation S144. A fourth discriminant value generator 850 substitutes the extracted group frame feature values into the discriminant function fy to obtain the discriminant values Y in operation S145. An obscenity determination unit 860 substitutes the discriminant values X and Y into a discriminant function Z to determine whether the video data is obscene in operation S146.

Referring to FIG. 2, the process of obtaining the discriminant value X (or a discriminant variable) will now be described. A data set 211 includes obscene video data (i.e. an obscene movie) and non-obscene video data (i.e. a soap opera). Frames are extracted from the data set 211 in operation S201, and then a predetermined number of obscene/non-obscene still pictures are selected in operation S202, thereby obtaining a set of selected frames 212. Visual features of the frames are extracted to optimize the discriminant functions in operation S203. This process is shown in a graph 213. Referring to the graph 213, each point denotes a feature vector value (for example, 100 feature vector values in the case above). The discriminant function fx is depicted as a straight line. The distance r between each vector value and the discriminant function fx has to be determined to obtain the discriminant result values I in operation S214. The discriminant value X is obtained by averaging the discriminant result values I for each video data unit in operation S215. The graph 213 is formed by using the SVM of the machine learning method. The SVM was developed in 1995 by Vapnik according to a statistical learning theory, and is suitable for classifying data on the basis of trained model data (a discriminant function). When data is classified into two or more groups using the SVM of the machine learning method, the training data is first learned to generate a classification model, and test data is classified on the basis of the classification model. If the SVM is used when many frame based visual features are present, an optimized discriminant model (discriminant function) can be easily generated.

By using the generated discriminant function, it is determined whether the extracted frames of the tables 1A and 1B contain obscene or non-obscene video data in operation S124, and the discriminant values X are generated through statistical flow analysis.

Referring to FIG. 3, the process of generating the group frame based discriminant value Y will now be described. Similar to the case of FIG. 2, a group of frames 311 are extracted as shown in the tables 1A and 1B in operation S301. The feature values are extracted from the group frame in operation S302. The group frame feature values are estimated in operation S303 corresponding to the operation S128. An optimum function is generated using the SVM in operation S304. A SVM learning process is performed using numerous extracted feature values for each video data unit. The discriminant values Y are generated using the discriminant model (discriminant function) generated as mentioned above in operation S305. The process of optimizing the discriminant function is shown in a graph 313. Referring to the graph 313, each point denotes a feature vector value (for example, 256 feature vector values in the above). The discriminant function fy is depicted as a straight line. The distance r between each vector value and the discriminant function fy has to be determined to obtain the discriminant values Y 314.

Referring to FIG. 4, the process of obtaining a synthetic discriminant function using the discriminant value X of FIG. 2 and the discriminant value Y of FIG. 3 will now be described. First, the method of obtaining the synthetic discriminant function is determined using a discriminant analysis method, a machine learning method, or a rule generating method in operation S401. Next, through experiment in operation S402, the synthetic discriminant function is obtained in operation S403. The method is selected by analyzing the correlation between the discriminant values X and Y and selecting through experiment the method which has the best precision according to the correlation analysis.

The discriminant values X and Y 412 obtained through experiment are analyzed to determine which method will be selected in operation 411. In this case, the method may be a discriminant analysis method, a machine learning method, or a rule generating method. When two-dimensional data composed of the discriminant values X and Y is analyzed, a discriminant analysis method provided by a statistic package, such as a statistical package for the social sciences (SPSS) or a statistical analysis system (SAS), may be used. The SVM method used to obtain the discriminant values X and Y may be also used to analyze experimental data. A rule based decision may be used if the correlation between the determinant values X and Y is significant or if it is determined that the final decision can be made using only the determinant value X or the determinant value Y. For example, the final decision may be made using only the discriminant value Y, and the discriminant value X may be then used to verify the final decision. As a result, a discriminant analysis method, a machine learning method, or a rule generating method is selected.

Finally, referring to FIG. 5, a method of determining whether input video data is obscene will now be described. The input video data 501 is composed of a series of frames 502. Key frames are extracted according to a predetermined policy in operation 503. It is determined whether each frame contains obscene video data in operation 504. An average of the values obtained from the above determination is estimated in operation 505. Alternately, the ratio of frames determined to contain obscene video data, or the sum of the top n frames determined to contain obscene video data may be estimated in operation 505. The values obtained from the determination are the discriminant values X.

Discriminant values are extracted from the extracted key frames in operation 506. Then, group frame feature values are generated, and are substituted into the group frame based discriminant function to generate the discriminant values Y.

The discriminant values X and Y are substituted into the synthetic discriminant function to determine whether the input video is obscene in operation 508.

In a method of generating discriminant functions for distinguishing obscene videos using visual features and a method of distinguishing obscene videos according to the present invention, frame based visual features and group frame based visual features are extracted from input video data to determine whether the video data is obscene, so that obscene video data stored in a computer system can be automatically and accurately distinguished.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the internet). In addition, a font ROM data structure according to the present invention can also be embodied as computer readable ROM, RAM, CD-ROMs, magnetic tapes, floppy disks, and optical data storage devices.

While the present invention has been particularly shown and described with reference to exemplary embodiments thereof, it will be understood by those skilled in the art that various changes in form and detail may be made therein without departing from the spirit and scope of the present invention as defined by the appended claims.

What is claimed is:

1. An apparatus for generating discriminant functions for distinguishing obscene videos using visual features of video data, comprising:
    a frame set generator which categorizes videos and then generates a first frame set including a predetermined number of frames and a second frame set including frames selected from the first frame set;
    a discriminant value generator which extracts visual features of frames of the second frame set and then generates a first discriminant value by generating a frame based discriminant function and determining whether each frame of the first frame set contains obscene video data;
    a group frame based discriminant value generator which creates a group of frames included in the first frame set, then generates a group frame based discriminant function by extracting visual features of the group, and then determines whether each frame of the group contains obscene video data; and
    a third discriminant function generator to which the first and second discriminant values are input and which generates a synthetic discriminant function by using a statistical discriminant analysis method, a machine learning method, or a rule generating method.

2. The apparatus of claim 1, wherein the frame based discriminant value generator comprises:
    a feature extractor which extracts a first visual feature of frames of the second frame set;
    a first discriminant function generator which generates a frame based discriminant function by using the extracted first visual feature through a machine learning method;
    a frame feature extractor which extracts a second visual feature of frames of the first frame set; a frame determining unit to which the second visual feature and the frame based discriminant function are input and which determines whether each frame of the first frame set contains obscene video data; and
    a first discriminant value generator to which the result obtained from the frame determining unit is input and which generates the first discriminant value as a fraction of frames determined to contain obscene video data, an average of discriminant values for each frame, or a sum of the integer number of frames determined to contain obscene video data.

3. The apparatus of claim 1, wherein the group frame based discriminant generator comprises:
    a group frame feature extractor which extracts statistical values including an average and median of visual features of the first frame set as group frame features;
    a second discriminant function generator to which the group frame features are input and which generates a group frame based discriminant function by using a machine learning method; and
    a second discriminant value generator which generates the second discriminant value by substituting the group frame features into the group frame based discriminant function.

4. An apparatus for distinguishing obscene videos using visual features of video data after receiving inputs of a frame based discriminant function, a group frame based discriminant function, and a synthetic discriminant function, which are generated on the basis of visual features of frames of the video data, the apparatus comprising:
    a frame extractor which extracts a predetermined number of frames from the input video data;
    an input frame feature unit which extracts a frame based first visual feature and a group frame based second visual feature from the extracted frames;
    a third discriminant value generator which determines whether the extracted frames contain obscene video data by substituting the first visual feature into the frame based discriminant function and then generates a third discriminant value;
    a fourth discriminant value generator which determines whether the extracted frames contain obscene video data by substituting the second visual feature into the group frame based discriminant function and then generates a fourth discriminant value; and
    an obscenity determination unit which combines the third and fourth discriminant values and then substitutes the combined value into the synthetic discriminant function to determine whether the input video data is obscene.

5. The apparatus of claim 4, wherein the input frame feature unit comprises:
    an input frame feature extractor which extracts a first visual feature including the color, shape, and texture of the frames; and
    an input group frame feature extractor which groups the frames and then extracts the second visual feature of each group frame, where the second visual feature is a statistical value including an average or median of visual features including the color, shape, and texture of the group frames.

6. The apparatus of claim 4, wherein the third discriminant value generator generates the third discriminant value as a fraction of frames determined to contain obscene video data, an average of discriminant values for each frame, or a sum of the integer number of frames determined to contain obscene video data.

* * * * *